US011931911B2

(12) United States Patent
Kopelas

(10) Patent No.: US 11,931,911 B2
(45) Date of Patent: Mar. 19, 2024

(54) COUPLING MECHANISM

(71) Applicant: BIC Violex S.A., Anoixi (GR)

(72) Inventor: Panagiotis Kopelas, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 158 days.

(21) Appl. No.: 17/320,284

(22) Filed: May 14, 2021

(65) Prior Publication Data

US 2021/0379777 A1 Dec. 9, 2021

(30) Foreign Application Priority Data

Jun. 8, 2020 (EP) .................................... 20178678

(51) Int. Cl.

*B26B 19/38* (2006.01)
*B26B 21/22* (2006.01)
*B26B 21/52* (2006.01)

(52) U.S. Cl.

CPC .......... *B26B 19/386* (2013.01); *B26B 21/225* (2013.01); *B26B 21/521* (2013.01)

(58) Field of Classification Search

CPC ..... B26B 21/521; B26B 21/225; B26B 21/40; B26B 21/4012; B26B 21/565; B26B 21/14; B26B 19/386

See application file for complete search history.

(56) References Cited

U.S. PATENT DOCUMENTS 3,918,155 A 11/1975 Atkins
3,938,247 A * 2/1976 Carbonell ............. B26B 21/225 30/47
4,739,553 A * 4/1988 Lazarchik ............. B26B 21/521 30/47
11,298,845 B2 * 4/2022 Zucker .................. B26B 21/225
(Continued)

FOREIGN PATENT DOCUMENTS

JP 2001340671 A * 12/2001 ............. B26B 21/14
JP 2014090787 A * 5/2014 ............. B26B 21/14
(Continued)

OTHER PUBLICATIONS

Extended European search report in European Application No. 20178678.7, dated Nov. 9, 2020 (6 pages).

*Primary Examiner* — Laura M Lee
(74) *Attorney, Agent, or Firm* — Bookoff McAndrews, PLLC

(57) ABSTRACT

A coupling mechanism for connecting a replaceable shaving cartridge of a shaving device to a handle of the shaving device includes a first connector, a second connector, and a locking member. The first connector of the replaceable shaving cartridge is adapted to move along an axial direction. The second connector of the handle is adapted to move along a substantially arc-shaped path with respect to the handle when at least one connector of the first connector and the second connector is pushed against the other connector. The second connector is adapted to mechanically engage
(Continued)

with the first connector in the course of its motion so as to reach an engaged position with the first connector. The locking member of the handle is adapted to lock the second connector when the latter is in the engaged position with the first connector.

14 Claims, 9 Drawing Sheets

(56) References Cited

U.S. PATENT DOCUMENTS

2002/0116822 A1* 8/2002 Coffin ................... B26B 21/225
30/34.2
2002/0116831 A1* 8/2002 Coffin ................... B26B 21/225
30/526
2002/0116832 A1* 8/2002 Coffin ................... B26B 21/222
30/527
2010/0139103 A1* 6/2010 Miyazaki .............. B26B 21/227
30/541

FOREIGN PATENT DOCUMENTS

WO WO 2004078426 A1 9/2004
WO WO 2008147133 A1 12/2008
WO WO 2010008932 A1 1/2010
WO WO 2012109412 A1 8/2012
WO WO 2017174120 A1 10/2017

* cited by examiner

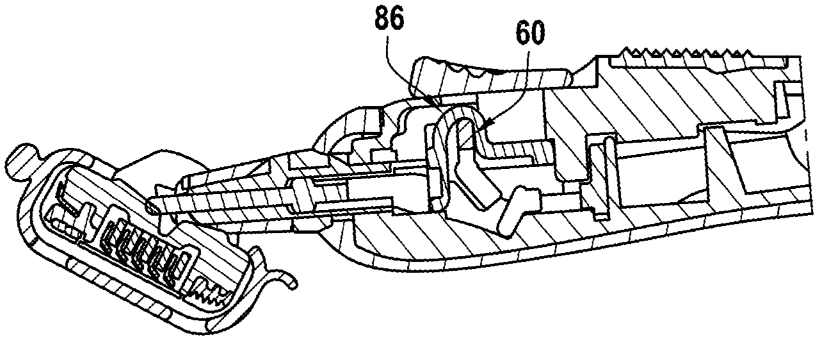
FIG.8B
FIG.8C
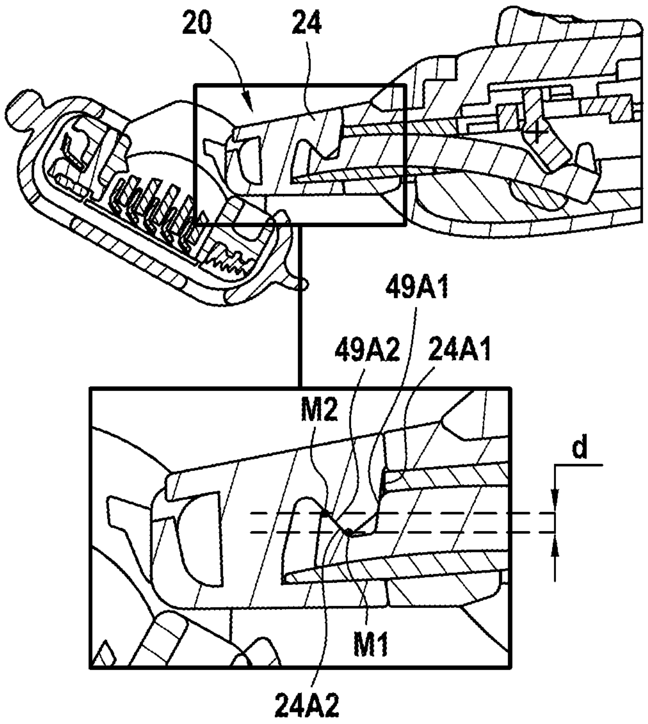

COUPLING MECHANISM

This application claims benefit from European patent application EP 20178678.7 filed on Jun. 8, 2020, its content being incorporated herein by reference.

FIELD

The present disclosure relates generally to the field of skincare, and in particular to shaving. More specifically, the present disclosure relates to a coupling mechanism for connecting a replaceable shaving cartridge of a shaving device to a handle of a shaving device.

BACKGROUND

A typical handheld shaving device includes a handle and replaceable shaving cartridges or heads which are configured to connect to the handle via a coupling mechanism. The coupling mechanism should allow for engagement and disengagement of the shaving cartridge to and from the handle.

Current coupling mechanisms usually require many components that move in a linear, horizontal, vertical or in-between, direction in order to achieve proper coupling through the involved components.

As numerous components are usually involved in such coupling mechanisms, space may therefore be required in the shaving devices for accommodating these components and allowing them to move in accordance with kinematics of the coupling mechanisms.

Also use of many components in such coupling mechanisms often leads to rather complex structures and kinematics for the coupling mechanisms.

SUMMARY

It is therefore desirable to provide an improved coupling mechanism for connecting a shaving cartridge of a shaving device to a handle of a shaving device, in particular a simplified coupling mechanism for connecting a shaving cartridge of a shaving device to a handle of a shaving device.

According to aspects of the present disclosure, a coupling mechanism for connecting a replaceable shaving cartridge of a shaving device to a handle of the shaving device comprises:

- a first connector of the replaceable shaving cartridge,
- a second connector of the handle that is adapted to move along a substantially arc-shaped path with respect to the handle when at least one connector of the first connector and the second connector is pushed against the other connector, the second connector being adapted to mechanically engage with the first connector in the course of the motion of the second connector so as to reach an engaged position with the first connector,
- a locking member of the handle that is adapted to lock the second connector when the latter is in the engaged position with the first connector. The coupling mechanism may allow for an improved connection of a shaving cartridge of a shaving device to a handle of the shaving device. Particularly, this connection may be simplified through using motion of the second connector along a substantially arc-shaped path, to allow the second connector to engage with the first connector and obtain locked connection.

According to aspects of the disclosure, the first connector includes a first connecting member and the second connector includes a second connecting member, the first connecting member and the second connecting member having respective engagement surfaces that come into contact with each other in the engaged position.

According to aspects of the disclosure, the second connecting member is configured to move towards the first connecting member and engage with the latter in the course of the motion of the second connector along a substantially arc-shaped path.

According to aspects of the disclosure, the first connecting member has a first hook portion that is oriented along a first direction and the second connecting member has a second hook portion that is oriented in a second direction that is opposite the first direction, the first and second directions being substantially perpendicular to an axial direction along which at least one connector of the first connector and the second connector is pushed against the other connector, the first and second directions lying in a plane that is parallel to a plane in which the substantially arc-shaped path of the second connector is lying.

According to aspects of the disclosure, the second connector has a substantially arcuate shape.

According to aspects of the disclosure, the substantially arc-shaped second connector is adapted to move under a pressure applied along an axial direction that is tangential to the substantially arcuate shape of the second connector.

According to aspects of the disclosure, the second connector is guided in the course of its motion along a substantially arc-shaped path through an inner guiding channel of the handle.

According to aspects of the disclosure, the second connector includes a complementary locking member that is adapted to interlock with the locking member when the second connector is in the engaged position with the first connector.

According to aspects of the disclosure, the locking member is a spring-biased rotating member that is able to rotate about a pivot axis traversing that member when pushed by the second connector in the course of the motion of the second connector along a substantially arc-shaped path.

According to aspects of the disclosure, the coupling mechanism further comprises a spring member configured to axially spring bias the second connector during the motion of the second connector along a substantially arc-shaped path.

According to aspects of the disclosure, the coupling mechanism further comprises an actuation mechanism of the handle that is mechanically linked to the locking member and adapted to be actuated by a user so as to cause the locking member to release the second connector.

According to aspects of the disclosure, the handle has an overall longitudinal shape and is symmetrical with respect to a longitudinal plane of symmetry P1, the second connector being able to move along a substantially arc-shaped path lying in a plane that is parallel to the symmetry plane P1 under a pressure having an axial direction that is substantially aligned with the overall longitudinal shape of the handle.

According to aspects of the disclosure, the motion of the second connector is a rotary motion about an axis of rotation that is located outside the handle and lies in a transverse plane that is perpendicular both to the symmetry plane P1 of the handle and the axial direction and that crosses the second connector.

According to aspects of the disclosure, a shaving device may comprise the coupling mechanism according to any aspect described above.

According to further aspects of the disclosure, a method for connecting a replaceable shaving cartridge of a shaving device to a handle of the shaving device comprises pushing at least one connector of a first connector of the replaceable shaving cartridge and a second connector of the handle against the other connector so as to cause the second connector to move along a substantially arc-shaped path with respect to the handle and mechanically engage with the first connector in the course of the motion of the second connector, pushing the at least one connector against the other connector being performed until reaching an engaged position of the second connector with the first connector and locking the second connector in the engaged position.

BRIEF DESCRIPTION OF THE DRAWINGS

Aspects of an embodiment will be described in reference to the drawings, where like numerals reflect like elements:

FIGS. 2C, 7B, 8B and 8C are side views corresponding to the same coupling operation phases as those illustrated in FIGS. 2B, 7A and 8A but according to a second section of the coupling mechanism of FIG. 1, the second section parallel to the first section is taken in a median plane of the pusher 54 in FIG. 1;

DETAILED DESCRIPTION

Figure 1:
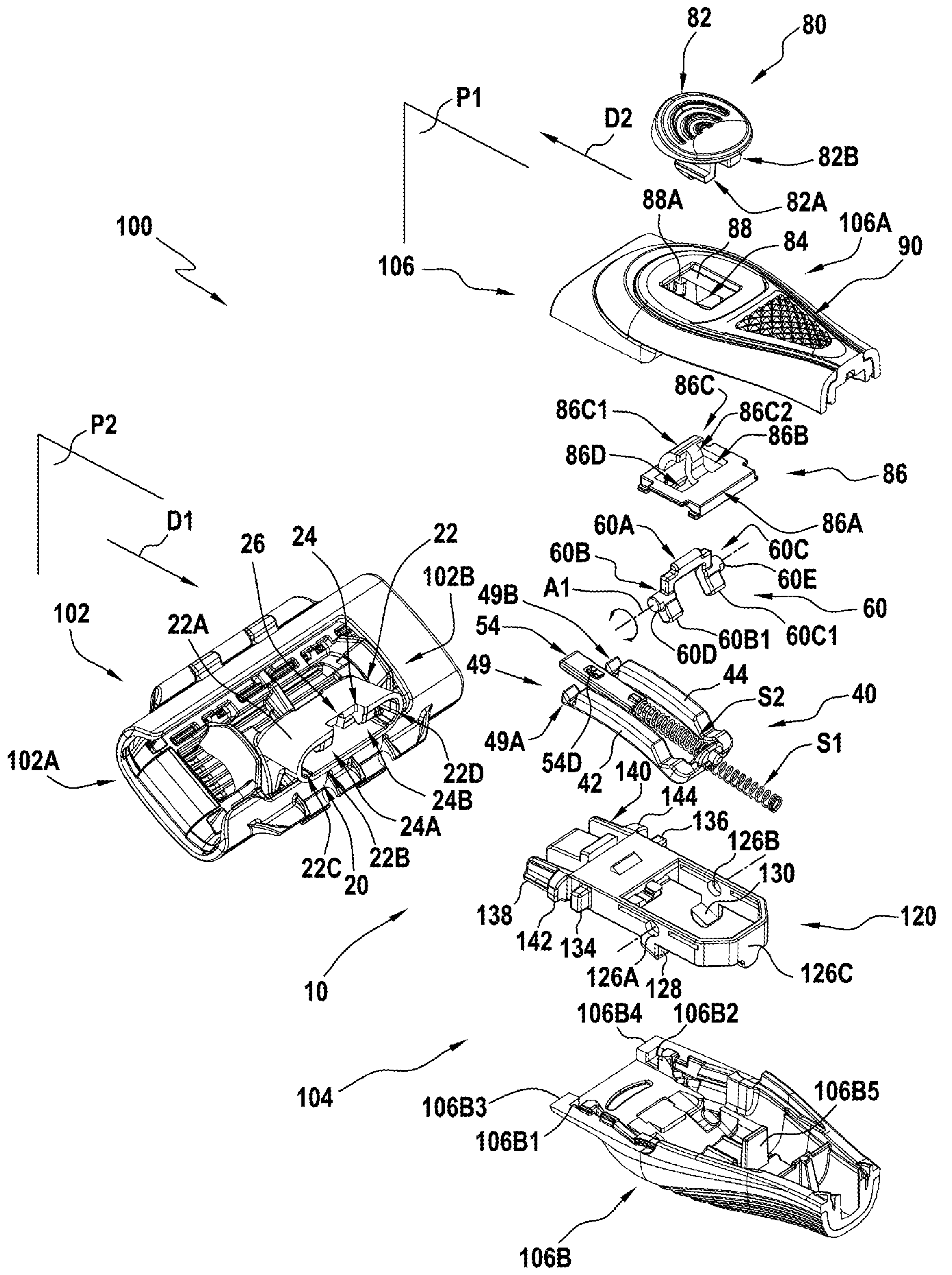
FIG. 1 is a side perspective exploded view of a coupling mechanism within a handheld shaving device according to aspects of the disclosure.

An embodiment of the coupling mechanism according to aspects of the disclosure will now be described with reference to FIGS. 1 to 8B, wherein like numerals represent like parts, and will generally be referred to by the reference numeral 10. Although the coupling mechanism 10 is described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

As shown in FIG. 1, the coupling mechanism 10 may be configured to couple or connect parts of a product, such as a handheld shaving device (hereafter, "the product") 100 having a head/replaceable shaving cartridge 102 and a handle 104. The handle 104 may have an overall longitudinal shape and may be symmetrical with respect to a longitudinal plane of symmetry P1 of the handle. The plane P1 extends vertically when the handle is vertically oriented as appearing in particular on FIGS. 1 and 2A-C. The coupling mechanism 10 may be included in part within replaceable shaving cartridge 102 and in part within handle 104, e.g. within a housing or casing 106 of the handle 104. Such housing 106 may be placed at one end of the handle 104, which here may be called "front end". The housing 106 may be directly connected to the remaining portion of the handle 104 (not visible on the drawings). It is also contemplated that the housing 106 may be indirectly connected to the remaining portion of the handle 104. Additionally, it is contemplated that the housing 106 may be integral to the remaining portion of the handle 104. As shown in FIG. 1, housing 106 may comprise two cover portions that form the whole housing when assembled together: an upper cover portion 106A and a lower cover portion 106B that may each form a hollow portion so that, when joined together, the hollow portions accommodate between their respective concavities different components, including the part of coupling mechanism 10 mounted inside handle 104.

Figure 2A:
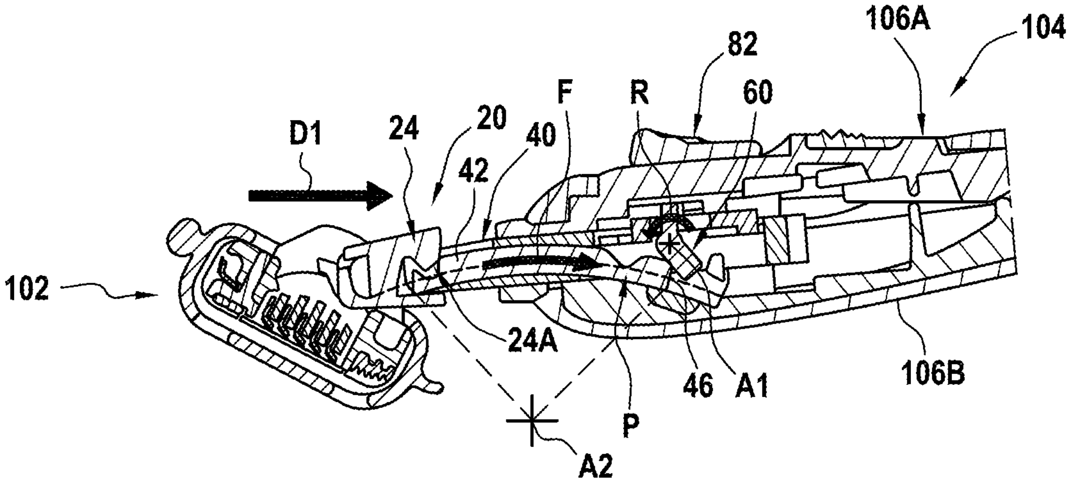
FIGS. 2A, 2B, 7A and 8A are side views according to a first section of the coupling mechanism of FIG. 1 in different successive phases of the coupling operation, the first section is taken in a vertical longitudinal plane crossing the arm 42 of the second connector 40 in FIG. 1.
Figure 2B:
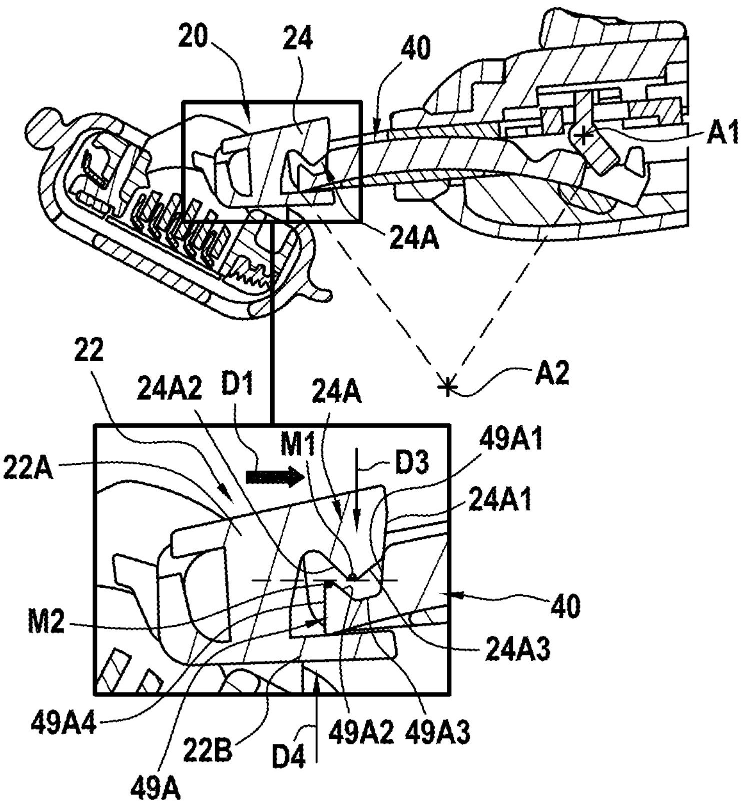
Figure 2C:
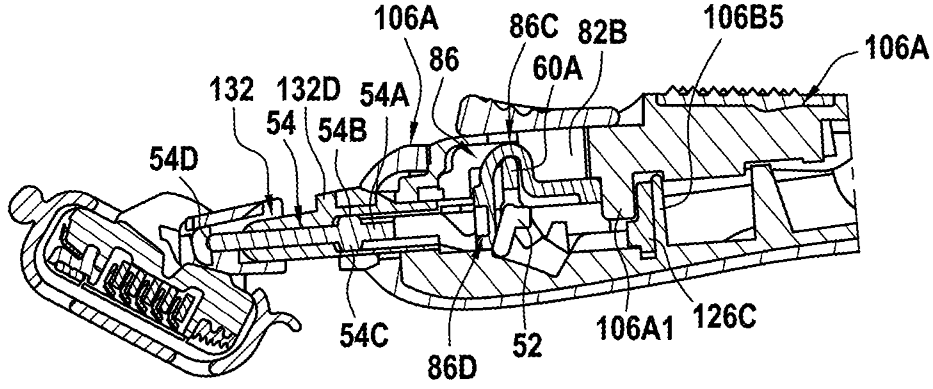

As shown in FIG. 1, the coupling mechanism 10 may include a first connector 20 that may be part of the replaceable shaving cartridge 102, a second connector 40 that may be part of the handle 104, e.g. of housing 106, and may be adapted or configured to engage with the first connector 20 when in contact with the latter and when the first connector or the second connector is axially pushed against the other connector or when both first and second connectors are pushed against each other. In the present embodiment, the second connector 40 may be adapted or configured to engage with the first connector 20 when axially pushed by the latter along an axial direction D1 (see the arrow referred to as D1 on FIGS. 1 and 2A-B) which represents the axial direction along which a user of the device 100 exerts an external pressure to push first connector 20 against second connector 40 so as to connect the replaceable shaving cartridge 102 to the handle 104. This axial direction may be substantially aligned with the overall longitudinal shape of the handle and may lie in the longitudinal plane of symmetry P1 or in a plane parallel thereto. When axially pushed by the first connector 20 the second connector 40 may be caused to move along a substantially arc-shaped path, e.g. may be caused to rotate, as illustrated in FIGS. 2A-C by the curved arrow F. As briefly mentioned above, the present disclosure may also envisage that a user of the device 100 pushes the second connector 40 against the first connector 20 to cause the second connector to move along a substantially arc-shaped path, e.g. to rotate. Here also the second connector 40 may be considered as being submitted to a pressure from the first connector 20 even the latter is in a fixed position based on the action and reaction principle. It may further be envisaged within the frame of the present disclosure that both first and second connectors be pushed or pressed against each other simultaneously to obtain engagement and locking.

The coupling mechanism 10 shown in FIG. 1 may also include a locking member 60 that may be part of the handle 104, e.g. of housing 106, and may be adapted or configured to allow locking of the second connector 40 when the latter is in an engaged position with the first connector 20.

The coupling mechanism 10 may also include an actuation mechanism 80 that may be actuated by a user so as to unlock or release the second connector 40 from its engaged position with the first connector 20. More particularly, the actuation mechanism 80 may be part of the handle 104, e.g. of housing 106, and mechanically linked to the locking member 60. The actuation mechanism 80 may include:

- an actuating button 82 that may be mounted to the upper cover portion 106A from the top of the latter, through a traversing aperture 84 so that a user may axially move, e.g. slide, the button 82 relative to the portion 106A along an axial direction indicated by arrow D2 in FIG. 1 (the axial direction D2, also called forward direction, may be opposite the axial direction D1) in order to unlock or release the second connector 40;
- an actuator 86 that may be located inside housing 106 and caused by the actuating button 82 to axially slide along direction D2 when the latter is slidably actuated by a user along the same direction.

As more particularly shown in the embodiment of FIG. 1, the actuating button 82 may include at its lower part that is inserted through aperture 84 two parallel spaced apart sliding members 82A, 82B or sliding legs each provided with a shoulder and that may respectively be able to slide along and against two corresponding parallel spaced apart upper guiding members 88, only one of which being shown through aperture 84. The guiding members, as member 88 in FIG. 1, are each provided with an abutment 88A at their forward or front end so as to stop the axial sliding motion of the sliding members 82A, 82B and, therefore, of the actuating button 82.

As more particularly shown in the embodiment of FIGS. 1 and 2C, the actuator 86 may include a peripheral frame 86A extending substantially horizontally and surrounding an inner aperture 86B, a bridge member 86C that extends upwardly from the peripheral frame 86A above the aperture 86C and a downwardly-extending member 86D that extends from a front portion of the peripheral frame 86A. The bridge member 86C may be formed by a front portion 86C1 that extends upwardly from the front portion of the peripheral frame 86A and a rear portion 86C2 that extends upwardly from a rear opposite portion of the peripheral frame 86A. Both front portion 86C1 and rear portion 86C2 also extend toward each other above the aperture 86B so as to meet and substantially form a bridge. The rear portion 86C2 is narrower than front portion 86C1 so that two substantially vertical engagement surfaces are provided on a rear face of the front portion 86C1 on either part of the rear portion 86C2. The front lower portion (not represented in FIG. 1) of the actuating button 82 may be located ahead of the two parallel spaced apart sliding members 82A, 82B of FIG. 1 and may connect them. The front lower portion of the actuating button 82 may be configured to engage with the rear portion 86C2 and the two substantially vertical engagement surfaces of the rear face of the front portion 86C1 so as to push axially the actuator 86 in the forward direction D2 when the actuating button 82 is slidably actuated by a user relative to the upper cover portion 106A along same direction. The rear portion of the peripheral frame 86A may extend substantially horizontally aft from rear portion 86C2, e.g. in a kind of a tray shape. The actuator 86 may be formed in a single piece, e.g. by molding.

The upper cover portion 106A may be provided on its outside upper surface with a rugged or texturized surface portion 90 so as to form a contact surface portion for a user's finger, e.g. a user's thumb. The outside upper surface of the button 82 may also be configured, e.g. through a succession of arc-shaped ribs, in order to prevent any sliding of a user's finger pressing thereon.

As more particularly shown in the embodiment of FIG. 1, the locking member 60 may take the form of a rotating or pivoting member that is able to rotate or pivot about an axis A1 over a relatively small angular stroke. Put it another way, the locking member 60 may perform a rocking movement when urged to do so either by the second connector 40 in the course of the engagement and locking phase or by the actuator 86 in the course of the disengagement and unlocking phase. The locking member 60 may take the form of an inverted fork with a substantially horizontal crossbar 60A and two parallel substantially downwardly-extending legs 60B, 60C that extend from the two opposing ends of the crossbar respectively. The two legs 60B, 60C are each provided with a pin 60D, 60E oriented outwardly relative to the inner space between the legs. The two pins 60D, 60E are aligned along the axis of rotation or pivot A1 and will enable rotation or pivot of the locking member 60 as will be seen subsequently. The two legs 60B, 60C have respective ends 60B1, 60C1 that are inclined in a rearward direction, i.e. towards the rear part of the handle. These inclined ends 60B1, 60C1 will cooperate with inclined surfaces of the second connector 40 in register therewith so as to enable locking of the second connector 40 as will be seen subsequently.

The handle 104, e.g. housing 106, may also include a support structure 120 that is intended to be partially engaged and secured into the hollow portion of lower cover portion 106B through appropriate configured inner zones of the latter. The support structure 120 may serve as a support and a guide for the second connector 40, in particular during its substantially arc-shaped, e.g. rotary, movement. The upper cover portion 106A is also internally configured so as to partially accommodate and secure the support structure 120 as well as the actuator 86 and locking member 60.

As shown in FIG. 1, the head/replaceable shaving cartridge 102 has a front part 102A that is oriented to the left of the drawing and intended to come into contact with a skin of a user and a rear part 102B that is oriented to the right and intended to couple with the facing handle 104 through coupling mechanism 10. The rear part 102B may include the first connector 20, also called adaptor, that may be attached thereto in a conventional manner. The first connector 20 may be coupled to the head 102 through a pair of arms that may cooperate respectively with camming surfaces provided in the head so as to allow pivoting motion of the head relative to the handle when the product 100 is in use as known in a conventional manner. The first connector 20 may include a hollow casing 22 that is open at one of its ends oriented rearwards relative to the front-rear orientation of the head 102 (as shown in FIG. 1) and may also be open, at least in part, at its opposite front end. The open-ended casing 22 may be adapted to engage with the second connector 40 as will be explained below. The first connector 20 may include a connecting member 24, called first connecting member, that may include a hook portion, called a first hook portion, that is oriented along a first direction D3 that may be here oriented downwardly, e.g. vertically (see FIG. 2B). The hook portion may be part of and located at the open rear end of the casing 22. In the present embodiment, the first hook portion may include two hook portions 24A, 24B that are laterally spaced apart from each other with respect to a longitudinal plane of symmetry P2 of the head 102 that coincides with the longitudinal plane of symmetry P1 of the handle 104 when both head 102 and handle 104 are coupled to each other. The two hook portions 24A, 24B may be identical. They may extend downwardly from a rear edge of an upper wall 22A of the casing 22 (see FIG. 1) and may be located on either side of a central recess 26 provided in the wall 22A and that extend forwardly from the wall rear edge.

A side view of the hook portion 24A is illustrated in FIGS. 2A and 2B which represent the mechanical cooperation or engagement process between the first connector 20 and the second connector 40 with an enlarged view thereof in FIG. 2B. The following description of the hook portion 24A likewise applies to the hook portion 24B and will not be repeated. As shown in FIGS. 2A and 2B, the first connector 20 is pushed axially along the axial direction D1 against the second connector 40 so that the hook portion 24A comes into contact with the second connector 40.

As more particularly shown in the FIGS. 2A-B embodiment, the hook portion 24A may include a first engagement surface 24A1 and a second engagement surface 24A2 that are intended to come into contact with corresponding engagement surfaces of the second connector 40 as will be described subsequently. In the described embodiment, the two engagement surfaces 24A1 and 24A2 do not engage at the same time with the corresponding engagement surfaces of the second connector 40 since the engagement process or phase of the coupling mechanism 10 is a progressive and continuous movement as will be further explained.

In the described embodiment, the first engagement surface 24A1 may be a substantially downwardly-extending, e.g. substantially vertical, wall that extends over a given height from the free rear edge of upper wall 22A of the casing 22. In the present embodiment, the wall forming the first engagement surface 24A1 may be slightly slanted towards inside the casing 22. The first engagement surface 24A1 may be an outside surface of the casing 22. As shown in FIGS. 2A and 2B, the upper wall 22A may be inclined with an ascending slope towards the aft of the casing 22.

In the described embodiment, the second engagement surface 24A2 may be a slanting surface, located and oriented inside the casing 22. As shown in FIG. 2B, the two engagement surfaces 24A1 and 24A2 may be connected by an intermediate surface 24A3, that is here arranged slantways. The two slanted surfaces 24A2 and 24A3 may substantially form a V and meet at a point referred to as M1 and that forms the tip of the V. Point M1 represents the lower portion of the hook portion 24A in the vertical arrangement of FIGS. 2A-B. As shown in FIG. 1, the casing 22 includes a lower wall 22B that is opposite the upper wall 22A and defines together with the latter the open rear end of the casing. This open end may have a reduced height below each of the hook portions 24A, 24B as shown in FIGS. 2A and 2B. The reduced height between point M1 and the inner upper surface of the lower wall 22B in FIG. 2B is however adapted to allow partial introduction of the second connector 40 for engagement purpose.

The second connector 40 may have a substantially arcuate shape in a side view as illustrated in FIGS. 2A and 2B (this view is taken in a plane that is parallel to the plane of symmetry P1). This side shape may be adapted to the shape of the substantially arcuate path followed by the second connector 40 in the course of its motion. In the present embodiment, the arc-shaped path that is followed by the second connector 40 in the course of its motion is circular and the motion is a rotary motion.

Figure 3:
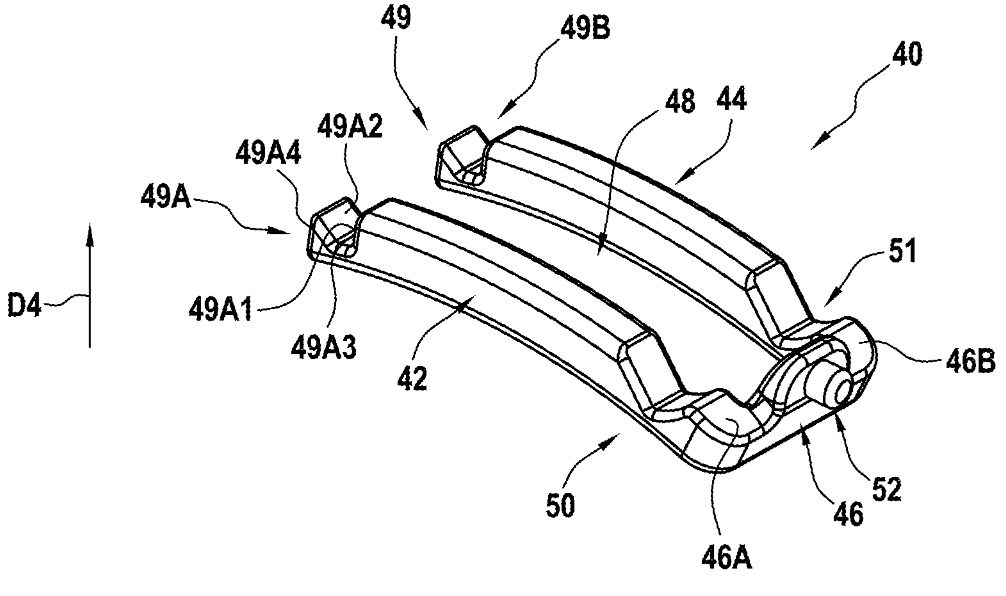
FIG. 3 is an enlarged perspective view of the second connector 40 of FIG. 1.

As shown in the embodiment of FIGS. 1 and 3, the second connector 40 may have a substantially elongate shape in a side view from a forward end that faces the first connector 20 in FIG. 1 to a rearward opposite end. The second connector 40 may substantially have the shape of a curved fork with two spaced apart parallel arms 42, 44 that extend forwardly in an arcuate shape from the two opposing ends of a transverse base 46 located at the rearward opposite end of the connector. The concavity of the arcuate shape may be oriented downwardly with respect to the vertical orientation on the Figures. The two arms 42, 44 define a void 48 therebetween (FIG. 3). This void will be used for mounting the second connector 40 inside the support structure 120.

The second connector 40 may include at its forward end a connecting member 49, called second connecting member, that may include a hook portion, called second hook portion. The second hook portion is oriented along a second direction D4 that may be here oriented upwardly, e.g. vertically, opposite the first direction D3 in FIG. 2B. In the present embodiment, the second hook portion may include two hook portions 49A, 49B that are located respectively at the free ends of the arms 44, 46. These hook portions 49A, 49B may be identical and laterally spaced apart from each other with respect to the longitudinal plane of symmetry P1 of the handle. The hook portions 49A, 49B are in register with the hook portions 24A, 24B of the first connector 20.

The following description of the hook portion 49A likewise applies to the hook portion 49B and will not be repeated. As more particularly shown in the embodiment of FIGS. 2A-B and 3, the hook portion 49A may include a first engagement surface 49A1 and a second engagement surface 49A2 that are both intended to come into contact with the respective engagement surfaces 24A1 and 24A2 of the first connector 20 as is shown in the engaged position of FIG. 8C.

In the described embodiment, the first engagement surface 49A1 may be a substantially downwardly-extending, e.g. vertical, wall that is located at the free forward end of the arm 42. In the present embodiment, the wall forming the first engagement surface 49A1 may be slightly slanted outwardly with the same slanting angle as that of first engagement surface 24A1 of first connector 20. The first engagement surface 49A1 may be oriented away from the arm 42, whereas the second facing engagement surface 49A2 may be oriented toward the arm.

In the described embodiment, the second engagement surface 49A2 may be a slanting surface with the same slope as the slanting surface 24A2 of the first hook portion 24A. As shown in FIG. 2B, the two engagement surfaces 49A1 and 49A2 may be connected by an intermediate surface 49A3 that may be flat (e.g. horizontal) or alternatively slanted. The two engagement surfaces 49A1 and 49A2 may substantially be arranged in an upwardly flared manner from the intermediate surface 49A3. The hook portion 49A may also include a front surface 49A4 that may be oriented away from the arm 42 and with substantially the same inclination as the first engagement surface 49A1. The front surface 49A4 is here the outermost surface of the arm 42. The second engagement surface 49A2 and the front surface 49A4 meet at a point referred to as M2. The point M2 is located at a height relative to the lowest point of the front surface 49A4 that is less than the reduced height of the opening between lower point M1 and the inner upper surface of the lower wall 22B in FIG. 2B.

The second connector 40 may include proximate its rearward end a complementary locking member that is adapted to interlock with the locking member 60 when the second connector 40 is in the engaged position with the first connector 20 as shown in FIG. 8C. The complementary locking member may be located in part on each arm 42, 44 and take the form of two identical parallel indents 50 and 51, facing upwardly, each having a substantially V-shape with inclined surfaces (see FIG. 3). The inclined surfaces of both indents 50, 51 are intended to cooperate with the respective inclined ends 6061, 60C1 of the two legs 60B, 60C of the locking member 60 in the engaged position.

The transverse base 46 of second connector 40 may be provided on its outer face that is oriented away from the second connector with an outside pin 52. As schematically represented in FIG. 1, a bias member 51 such as a compression spring may be mounted at one of its opposed ends around the pin 52, the other end being mounted against support structure 120. The second connector 40 may be symmetrical with respect to a longitudinal plane of symmetry as the plane P2 in FIG. 1.

As shown in FIG. 1, a pusher 54, e.g. having a longitudinal shape that is here axially oriented, may be located in the void 48 between the arms 42, 44 of the second connector 40. Pusher 54 may be provided at one of its two opposed ends, here a rear end, with a pin 54A (see FIG. 2C) around which a first end of a bias member S2, such as a compression spring as shown in FIG. 1, may be mounted. A second opposite end of bias member S2 may be mounted against the front surface of the downwardly-extending member 86D of the actuator 86 illustrated in FIG. 2C. Pusher 54 has a front end that is intended to be introduced inside casing 22 of the first connector 20 in the course of the engagement process and extend through the open forward end of casing 22 at the end of the process as shown in FIG. 8B. Pusher 54 comes into contact with a cam surface of the head at the end of the engagement process when the coupling mechanism is locked. During subsequent use of the product 100 the head 102 will be applied against the skin of a user. This will cause the head 102 to pivot relative to the first connector 20 and therefore the handle 104, thanks to the contact between the pusher 54 and the head cam surface and the sliding motion of the arms of the first connector 20 along the corresponding camming surfaces of the head as is known in a conventional manner. Pusher 54 may be provided with a stop 54B on its upper face (see FIG. 1) and a stop 54C on its opposed lower face (see FIG. 2C). Pusher 54 may take the form of a lug.

Figure 4:
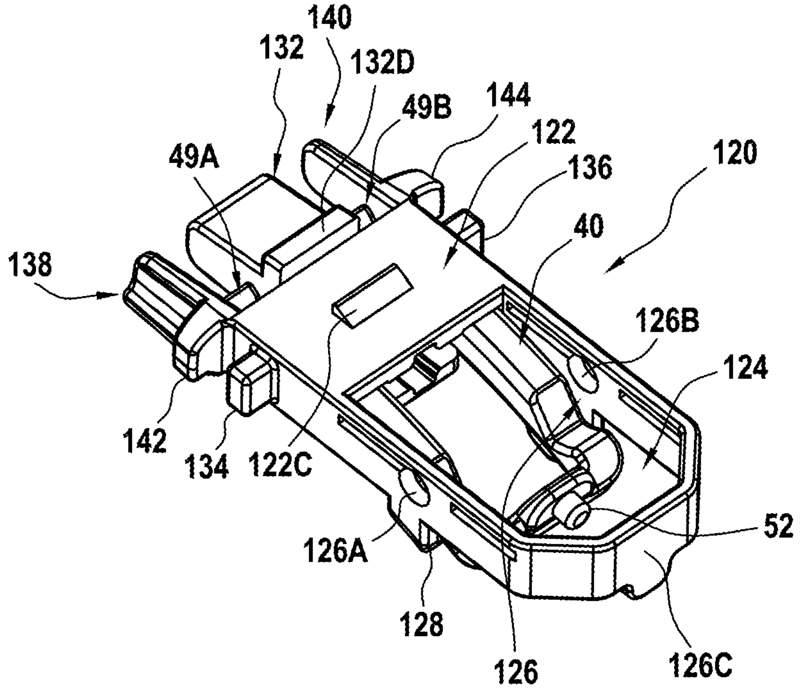
FIGS. 4 to 6 are different perspective and cross-section views of the support structure 120 of FIG. 1 enclosing the second connector 40.
Figure 5:
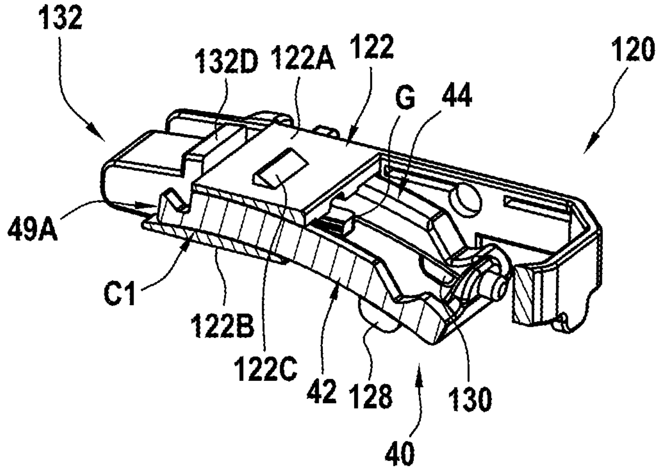
Figure 6:
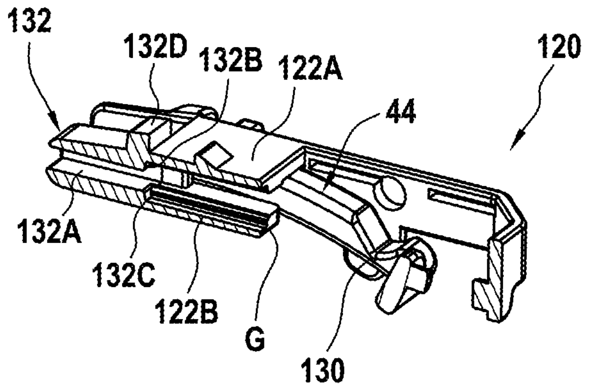

The support structure 120 may accommodate the second connector 40 as shown in FIGS. 4 to 6 and guide its movement along a substantially arcuate-shaped path, e.g. here represented by a circle segment. The support structure 120 may have a substantially elongate shape that is horizontally oriented in FIG. 4 and include two parts: a first front part that includes an inner guiding channel 122 for the arms 42, 44 of the second connector 40 and a second rear part that has a void 124 accommodating the rear end of the second connector 40 together with the indents 50, 51 thereof.

More particularly, the second rear part of support structure 120 may include a peripheral wall 126 that extends horizontally so as to adopt a substantially U shape (when viewed from above) that outwardly borders the void 124 and meet at the first front part of support structure 120. As shown in FIGS. 1 and 4 to 6, the peripheral wall 126 may include at its bottom edge, e.g. at the bottom edge of the two opposite wall portions that form the two branches of the U shape peripheral wall 126, respectively two downwardly-extending supporting members 128, 130 forming each an inclined sliding support over which each arm 42, 44 of the second connector 40 may slide in the course of its motion. Two vertical traversing holes 126A, 126B may be provided respectively in the above two opposite wall portions of the U shape peripheral wall 126. The holes 126A, 126B are in register with each other and allow to accommodate therein the respective pins 60D, 60E of the locking member 60 and guide its pivot or rocking movement about horizontal axis A1. The U-shaped peripheral wall 126 may include at its root a transverse wall portion 126C that forms the rear end of support structure 120.

The inner guiding channel 122 of the support structure 120 may include a casing with a top wall 122*a* and a bottom wall 122*b* (see the cross-section of FIG. 5) defining therebetween two parallel axial channels each for accommodating and guiding one of the two arms 42, 44 of the second connector 40. A first channel C1 is shown in FIG. 5 for guiding the arm 42, the other channel being not visible here. The two channels may have upper and lower inner guiding surfaces with curvatures that are complementary to the curvatures of the upper and lower surfaces of each arm 42, 44 so as to smoothly and reliably guide them through the channels. The top wall 122*a* may also be provided with a protruding member 122*c* that acts as a ramp for the installation of the support structure 120 in the upper cover portion 106A.

The first front part of the support structure 120 may also include a protruding casing 132, for example forming a kind of sheath, in a forward central location relative to the casing 122. The sheath 132 may be arranged in a central position located between the two channels and the two arms of the second connector 40 so that the two arms may be positioned on either side of the sheath 132 during their sliding motion as shown in FIG. 5 cross-section. The sheath 132 may have a longitudinal hollow portion 132A, as a central inner channel, as shown in FIGS. 2C and 6, that allows to axially receive the front part of the axial pusher 54. Two inner upper and lower shoulders 132B, 132C may engage with the two stops 54B, 54C respectively so as to prevent the pusher 54 from moving further forwardly when installed in the position of FIG. 2C. The central inner channel 132A may extend rearwards between top wall 122A and bottom wall 122B of the casing through a longitudinal groove G in which the bottom portion of the pusher 54 may extend and slide for its installation until reaching the blocked installed position of FIG. 2C. A transverse shoulder 132D may be provided on the top wall of sheath 132. This shoulder rests against the front edge of the upper cover portion 106A as shown in FIG. 2C. The first front part of the support structure 120 may include two side protruding tabs 134, 136 located on either side of the side walls of the casing 122 and that each extend away from the latter. As shown in FIG. 1, these side protruding tabs 134, 136 partly engage with the two corresponding recesses 106B1, 106B2 provided inside the lower cover portion 106B, proximate its front part. Corresponding recesses are provided in the upper cover portion 106A to allow partial engagement of side protruding tabs 134, 136. This arrangement makes it possible to prevent the support structure 120 from moving forward axially when installed between the two cover portions 106A, 106B. The first front part of the support structure 120 may also include on either side of the sheath 132 two forwardly-extending protruding members 138, 140 each provided a side shoulder and that are intended to mate into two longitudinal cavities 22C, 22D located respectively between each hook portion 24A, 24B and the corresponding side wall of casing 22 (see FIG. 1). A side stop 142, 144 may be provided at the root of each protruding member 138, 140 so as to rest against an outside front surface of spaced apart inwardly-oriented side edges 106B3, 106B4 of the lower cover portion 106B when the structure support 120 is installed inside the latter. These side edges 106B3, 106B4 define therebetween an opening space for receiving the structure support 120. The upper cover portion 106A is configured likewise for cooperating with the structure support 120. When the structure support 120 is received inside the lower cover portion 106B, the two spaced apart inwardly-oriented side edges 106B3, 106B4 are each sandwiched between each couple of side protruding members 142, 134 and 144, 136 of the structure support 120, thereby preventing any axial motion of the latter. When both upper and lower cover portions are assembled together while accommodating the structure support 120 therebetween, the latter is completely immobilized. The lower cover portion 106B may also include an upwardly-extending wall 106B5 (FIGS. 1 and 2C) that may serve as an axial stop for rear portion 126C of support structure 120. A downwardly-extending wall 106A1 is provided in the upper cover portion 106A (FIG. 2C) so that when both upper and lower cover portions are assembled together, the rear portion 126C of support structure 120 is sandwiched between the walls 106B5 and 106A1 of both cover portions, thereby immobilizing the support structure 120.

When the above-described components of the handle 104 have been assembled, the pusher 54 has been inserted into the inner central channel of the sheath 132 until coming to a stop position (FIG. 2C) and its forward end 54D protrudes from sheath 132. The locking member 60 has been mounted in a pivoting or rocking manner relative to the structure support 120 through the pins 60D, 60E inserted into the holes 126A, 126B of structure support 120. The upper part of the locking member 60 including its crossbar 60A is inserted through the inner aperture 86B of the actuator 86 so as to come into contact with the inner concave face of the bridge member 86C (FIG. 2C). The locking member 60 is thus partially enclosed by the bridge member 86C in such a manner that axially moving the actuator 86 along the direction D2 of FIG. 1 causes the locking member 60 to pivot or rock about its axis A1 and vice versa. The button 82 has been partially inserted through aperture 84 so that its front lower portion may engage with the rear portion 86C2 of the actuator 86. The second connector 40 is mounted inside the support structure 120 by inserting and sliding the arms 42, 44 into the inner channels of casing 122 until reaching a stop position as in FIG. 2A where the second connecting member 49, e.g. the hook portions 49A, 49B, protrudes from the casing 122 of the support structure 120 in a foremost extended position. In this position of FIG. 2A, the hook portions 49A, 49B may be ready so start an engagement process with the hook portions of the first connector. FIG. 4 illustrates a position in which the arms 42, 44 are not fully inserted through the support structure 120. When the second connector 40 is in the foremost extended position of FIG. 2A, the bias member S1 may lie between the rearwardly-extending pin 52 and the inner face of rear wall portion 126C of the support structure 120. The second connector is therefore biased in this position under the action of bias member S1 which is here in a compressed state. The bias member S2 may lie between the rearwardly-extending pin 54A of the pusher 54 and the front surface of the downwardly-extending member 86D of the actuator 86 illustrated in FIG. 2C, thereby maintaining the actuator 86 and the locking member 60 it encloses in a rest position as shown in FIGS. 2A and 2C.

When viewed in a plane as that of FIG. 2A that is parallel to the symmetry plane P1 of the handle 104 the second connector 40 has a substantially arcuate shape and moves along a substantially arc-shaped path that may be represented here by a circular segment P in dotted lines. The arrow denoted F illustrates the circular movement of the second connector 40 about an axis of rotation A2. This axis is perpendicular both to the FIG. 2A plane and the symmetry plane P1 and lies in a transverse vertical plane that is both perpendicular to the symmetry plane P1 and the axial direction D1 and crosses the second connector 40. As shown in FIG. 2A, the axis of rotation A2 may lie outside the handle 104 in a position located below the front end of the handle 104. In the position of FIG. 2A the transverse vertical plane including the axis A2 may substantially be a median transverse plane for the second connector 40. The circular segment P is a portion of a circle with a radius that may be chosen as small as possible so that the axial extension of the second connector in a rectilinear direction (e.g. along direction D1) be as small as possible.

A method for connecting the replaceable shaving cartridge 102 of the shaving device 100 to the handle 104 of the shaving device will now be described with reference to the FIGS. 2A-2C, 7A-7B and 8A-8C.

As shown in FIGS. 2A-C, the cartridge 102 is pushed axially by a user along axial direction D1 towards the handle 104 with the aim of connecting them. The first connector 20 is then pushed along axial direction D1 (under the user's axial pressure) and comes into contact with the axially protruding second connector 40. The axial direction D1 along which user's pressure is applied to the second connector 40 is tangential to the substantially arcuate shape of the second connector 40 and, more particularly, tangential to the arc-shaped path or circle segment P. The first connector 20 is pressed against the front end of the second connector 40 that bears the connecting member including the hook portions 49A, 49B.

As more particularly shown in the enlarged view of FIG. 2B, when the first connector 20 is axially pushed against the second connector 40 the hook portions 49A, 49B penetrate into the open end of casing 22 below the hook portions 24A, 24B of the first connector. The intermediate slanted surface 24A3 may act as a ramp during the axial penetration movement of the hook portions 49A, 49B by guiding the point M2 along this ramp in the forward direction inside the casing 22. This penetration movement is stopped when the first engagement surface 24A1 abuts the first engagement surface 49A1 in the position of FIG. 2B. In this position, the point M2 is located at a height that is less than the height of the point M1 (see FIG. 2B). In this position, the locking member 60 is in its rest position as the one represented in FIG. 1. The locking member 60 rests against the rear transverse base 46 of the second connector. This position represents the beginning of the engagement process that will lead to engagement and locking of the second connector 40 with the first connector 20. When axially pushed by the first connector 20 the second connector 40 compresses bias member S1.

Figure 7A:
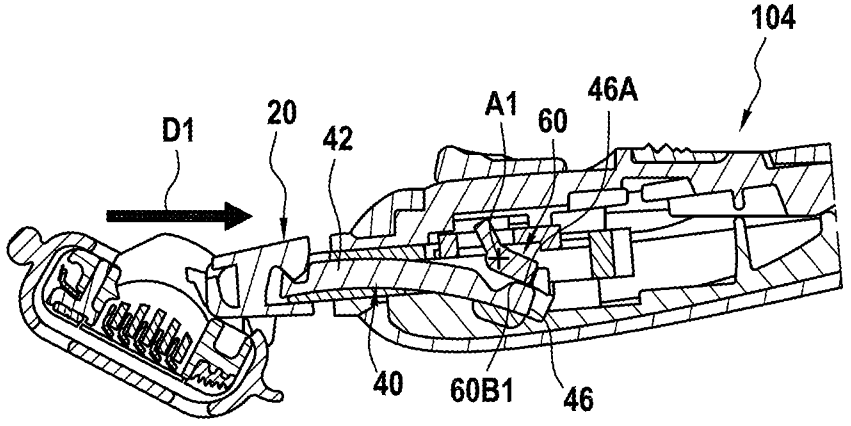
Figure 7B:
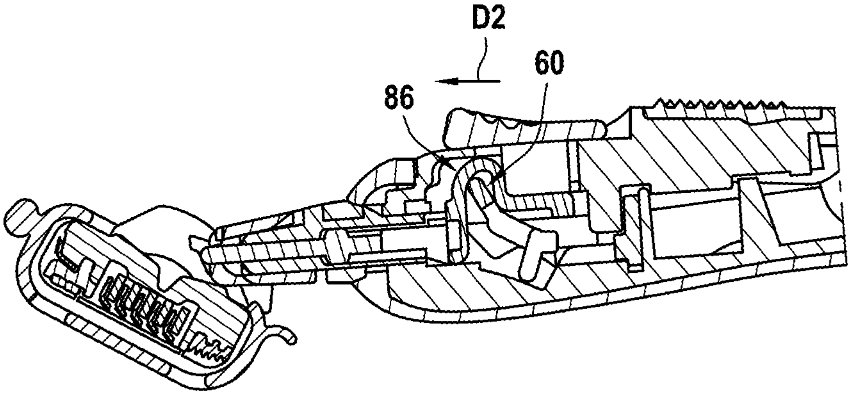

When pushing further along axial direction D1, the first connector 20 continues to move towards the handle 104 as shown in FIGS. 7A and 7B and pushes rearwardly the second connector 40. The arms 42, 44 of the second connector 40 are caused to retract inside casing 122 and slide inside the channels thereof. In the course of this sliding motion the arms 42, 44 move with respect to the handle 104 along the arc-shaped path P, in a rotary motion, in the direction of the arrow F in FIG. 2A. The second connector 40 is then forced to rotate clockwise around the axis of rotation A2. During this movement, the hook portions 49A, 49B move upwardly towards the hook portions 24A, 24B to engage further with the latter. The vertical distance between the positions of the points M1 and M2 is reducing as the second connector 40 is moving rearward. When the second connector 40 is moving rearward it pushes the legs 60B, 60C of the locking member 60 as indicated by the arrow R in FIG. 2A, causing the latter to rotate counterclockwise (FIG. 7A) and allowing the ends 60B1, 60C1 of the legs 60B, 60C to slide on cam surfaces 46A, 46B of the second connector 40 (FIG. 3). The rear end of the second connector 40 including the transverse base 46 passes below the locking member 60 in the course of the rotary motion of the second connector 40 (FIG. 7A) and the counterclockwise rotation of the locking member 60 causes the actuator 86 to move forward along direction D2 as shown in FIG. 7B, thereby compressing the bias member S2 between the pusher 54 and the actuator 86.

Figure 8A:
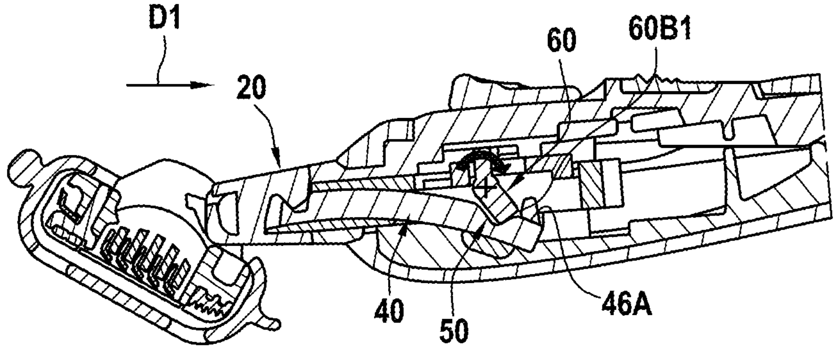

As shown in FIGS. 8A-8C, when still being axially pushed by the first connector 20, the second connector 40 is further moved according to its guided rotary motion (bias member S1 is further compressed) until the ends 60B1, 60C1 of the legs 60B, 60C of the locking member 60 are no longer maintained against the cam surfaces 46A, 46B. The locking member 60 is then caused to rotate clockwise under the biasing action of bias member S2 against the actuator 86 and that pushes the latter rearward. At the same time the ends 60B1, 60C1 of the legs 60B, 60C respectively slide into the indents 50 and 51 of the second connector 40 and interlock therewith, thereby preventing the latter to move back forward under the action of the compressed bias member S1. In this position, the second connector 40 is engaged and locked with the first connector 20. As shown in FIG. 8C, in this position the first and second engagement surfaces 24A1, 24A2 and 49A1, 49A2 of the first and second connectors are fully engaged with each other. In this fully engaged position the point M2 has reached a position that is higher than the position of the point M1, contrary to the initial position of FIG. 2B and the respective hook portions of the first and second connectors mate with each other so as to prevent any axial movement therebetween. In this position the vertical distance d between the two points is sufficient for ensuring a reliable engagement of the two connectors (FIG. 8C). As the second connector 40 is simultaneously locked by the locking member 60 as explained above, the two connectors 20, 40 can no longer be moved relative to each other and are therefore safely and reliably connected or coupled to each other. Thus, the cartridge 102 has been simply, safely and reliably connected to the handle 104 through the described method or process. The circular motion of the second connector 40 which makes it possible to achieve engagement with the first connector 20 and locking in the engaged position requires less space than with components moving according to a rectilinear motion. Further, the moving parts of the mechanism involved for achieving such engagement and locking are bordered by an envelope with reduced dimensions, therefore leading to a less bulky mechanism. The same is also provided by an engagement and locking process obtained through applying with pressure the second connector 40 against the first connector 20.

Figure 9A:
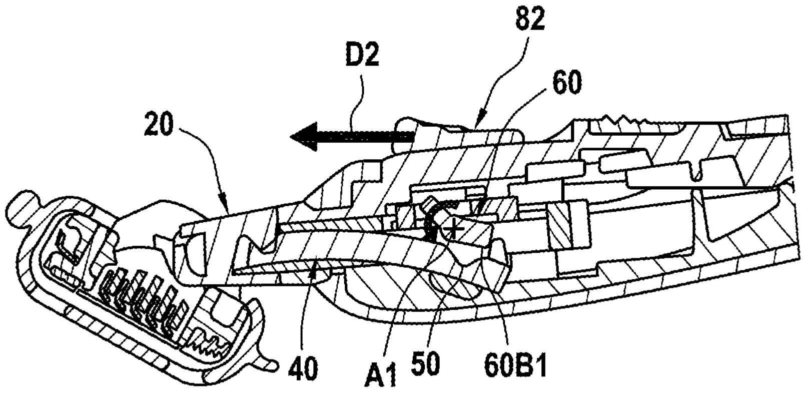
FIGS. 9A and 10A are side views according to the first section of the coupling mechanism of FIG. 1 in different successive phases of the decoupling operation.
Figure 9B:
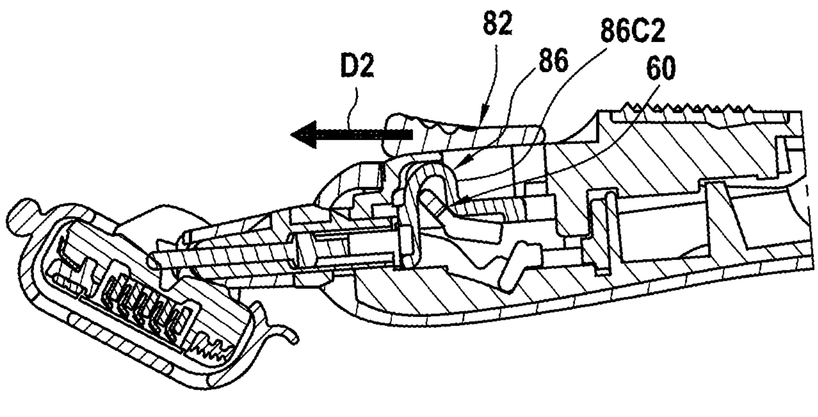
FIGS. 9B and 10B are side views corresponding to the same coupling operation phases as those illustrated in FIGS. 9A and 10A but according to the second section of the coupling mechanism of FIG. 1.
Figure 10A:
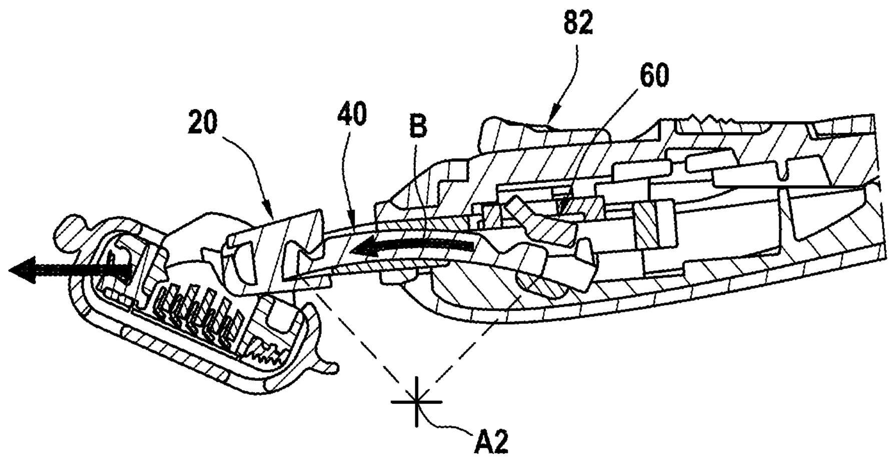
Figure 10B:
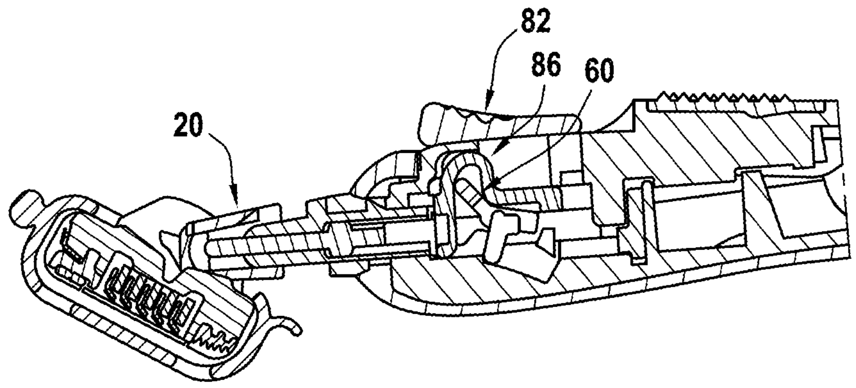

The disengagement phase will now be described with reference to FIGS. 9A-B and 10A-B. This phase is triggered by a user actuating the button 82 as shown in FIGS. 9A-B through sliding the button axially along the direction D2. Sliding forward the button 82 causes the actuator 86 to move forward (FIG. 9B), thereby forcing the locking member 60 to rotate counterclockwise around its pivot or rotation axis A1 as shown by the rotating arrow in FIG. 9A (the rear portion 86C2 of the actuator pushes on the crossbar 60A of the locking member 60). Rotating the locking member 60 causes the ends 60B1, 60C1 of its legs to move away from the indents 50, 51 of the second connector 40. During this movement the bias member S2 is compressed by the forward motion of the actuator 86. As the second connector 40 is no longer locked in position by the locking member, the compressed bias member S1 urges the second connector 40 to move back along its rotary path, in a reverse direction denoted B in FIG. 10A. This reverse rotary motion around the axis A2 is a continuous and progressive movement in the course of which the hook portions 24A, 24B and 49A, 49B of the first and second connectors 20, 40 respectively are progressively disengaging from one another. The hook portions 49A, 49B of the second connector 40 are lowering relative to the hook portions 24A, 24B of the first connector 20, the distance d in FIG. 8C is decreasing so as to lower the point M2 to a lower position with respect to the point M1 as in FIG. 2B. In this position, the first connector 20 is no longer engaged with the second connector 40 and therefore can be successfully axially ejected from the second connector 40 and the handle 104 under the action of the bias member S1.

The invention claimed is:

1. A coupling mechanism of a shaving device, for connecting a replaceable shaving cartridge to a handle of the shaving device, the coupling mechanism comprising:

a first connector of the replaceable shaving cartridge comprising a first hook portion including a first engagement surface, a second engagement surface, and an intermediate surface, the second engagement surface and the intermediate surface forming a V-shape meeting at a first engagement point, a second connector of the handle comprising a second hook portion oriented opposite the first hook portion and including a first surface and a second engagement surface forming an inverted V-shape and meeting at a second engagement point, the second connector being adapted to move along a substantially arc-shaped path with respect to the handle when at least one connector of the first connector and the second connector is pushed against the other of the first connector and the second connector, the second connector being adapted to mechanically engage with the first connector in a course of motion of the second connector so as to reach an engaged position with the first connector, a locking member of the handle that is adapted to lock the second connector when the second connector is in the engaged position with the first connector, wherein the handle of the shaving device has an overall longitudinal shape and is symmetrical across a longitudinal plane of symmetry, the second connector being able to slideably translate along a substantially arc-shaped path lying in a plane that is parallel to the plane of symmetry under a pressure applied in an axial direction that is substantially aligned with the overall longitudinal shape of the handle, and wherein in the engaged position the second engagement point is closer to the substantially arc-shaped path than the first engagement point.

2. The coupling mechanism of claim 1, the second engagement surface of first hook portion and the second engagement surface of the second hook portion come into contact with each other in the engaged position.

3. The coupling mechanism of claim 2, wherein the second connecting member and the first connecting member are configured to move such that they engage with one another based on the motion of the second connector along the substantially arc-shaped path.

4. The coupling mechanism of claim 2, wherein the first and second directions are substantially perpendicular to an axial direction along which at least one connector of the first connector and the second connector is pushed against the other connector, the first and second directions lying in a plane that is parallel to a plane in which the substantially arc-shaped path of the second connector is lying.

5. The coupling mechanism of claim 1, wherein the second connector has a substantially arcuate shape.

6. The coupling mechanism of claim 5, wherein the substantially arc-shaped second connector is adapted to move under a pressure applied along an axial direction that is tangential to the substantially arcuate shape of the second connector.

7. The coupling mechanism of claim 1, wherein the second connector is guided in the course of its motion along a substantially arc-shaped path through an inner guiding channel of the handle.

8. The coupling mechanism of claim 1, wherein the second connector includes a complementary locking member that is adapted to interlock with the locking member when the second connector is in the engaged position with the first connector.

9. The coupling mechanism of claim 1, wherein the locking member is a spring-biased rotating member that is able to rotate about a pivot axis traversing that member when pushed by the second connector in the course of the motion of the second connector along a substantially arc-shaped path.

10. The coupling mechanism of claim 1, further comprising a spring member configured to axially spring bias the second connector during the motion of the second connector along a substantially arc-shaped path.

11. The coupling mechanism of claim 1, further comprising an actuation mechanism of the handle that is mechanically linked to the locking member and adapted to be actuated by a user so as to cause the locking member to release the second connector.

12. The coupling mechanism of claim 1, wherein the motion of the second connector is a rotary motion about an axis of rotation that is located outside the handle and lies in a transverse plane that is perpendicular both to the symmetry plane of the handle and the axial direction and that crosses the second connector.

13. A shaving device comprising the coupling mechanism of claim 1.

14. A method for connecting a replaceable shaving cartridge of a shaving device to a handle of the shaving device, the method comprising pushing at least one connector of a first connector of the replaceable shaving cartridge and a second connector of the handle against the other of the first connector and the second connector so as to cause the second connector to move along a substantially arc-shaped path with respect to the handle and mechanically engage with the first connector in a course of motion of the second connector, pushing the at least one connector against the other connector being performed until reaching an engaged position of the second connector with the first connector and locking the second connector in the engaged position, wherein the handle has an overall longitudinal shape and is symmetrical across a longitudinal plane of symmetry, the second connector being able to slideably translate along a substantially arc-shaped path lying in a plane that is parallel to the plane of symmetry under a pressure applied in an axial direction that is substantially aligned with the overall longitudinal shape of the handle, wherein the first connector comprises a first hook portion including a first engagement surface, a second engagement surface, and an intermediate surface, the second engagement surface and the intermediate surface forming a V-shape meeting at a first engagement point, the second connector comprises a second hook portion including a first surface and a second engagement surface forming an inverted V-shape and meeting at a second engagement point, wherein the motion of the second connector is a rotary motion about an axis of rotation that is located outside the handle and lies in a transverse plane that is perpendicular both to the symmetry plane of the handle and the axial direction and that crosses the second connector, in the engaged position the second engagement point is closer to the axis of rotation than the first engagement point.

* * * * *